United States Patent [19]
Perisho et al.

[11] Patent Number: 5,724,716
[45] Date of Patent: Mar. 10, 1998

[54] METHOD FOR TERMINATING WIRE OR OTHER ELONGATED GENERALLY RIGID ELEMENTS

[75] Inventors: Randal J. Perisho, Moberly; Tave E. Hass, Columbia; David R. Webb, Excello; Steve W. Ancell, Huntsville; Jeff E. Tayon, Moberly; David L. Crossgrove, Livonia, all of Mo.

[73] Assignee: Dura Automotive Systems, Inc., Moberly, Mo.

[21] Appl. No.: 643,013

[22] Filed: May 2, 1996

Related U.S. Application Data

[62] Division of Ser. No. 541,737, Oct. 10, 1995, Pat. No. 5,566,432, which is a continuation of Ser. No. 104,185, Aug. 9, 1993, abandoned.

[51] Int. Cl.$^6$ ........................................... B23P 11/00
[52] U.S. Cl. ........................................ 29/517; 29/525.05
[58] Field of Search ................................ 29/516, 517, 523, 29/525.05, 525.06; 403/278, 279, 282; 24/703.1, 115 A, 114.5

[56] References Cited

U.S. PATENT DOCUMENTS

| | | |
|---|---|---|
| 4,307,042 | 12/1981 | Berich . |
| 4,373,830 | 2/1983 | Ikesue ................................. 29/517 X |
| 4,498,222 | 2/1985 | Ono et al. ............................... 29/509 |
| 4,555,832 | 12/1985 | Sano et al. ............................... 24/682 |
| 4,575,916 | 3/1986 | Naitoh et al. .......................... 29/517 |
| 5,156,439 | 10/1992 | Idlani et al. ....................... 403/282 X |
| 5,230,410 | 7/1993 | Yamamuro ............................ 192/8 C |
| 5,263,247 | 11/1993 | Adachi et al. ................. 29/525.05 X |

*Primary Examiner*—S. Thomas Hughes
*Attorney, Agent, or Firm*—Arnold, White & Durkee

[57] ABSTRACT

The invention provides a termination assembly adapted to retain an elongated, generally rigid member, such as a wire, to a mounting surface. A mounting surface is configured to define a receiving channel, which may include an aperture. A deformable sleeve member is configured to engage the generally rigid member to be retained and the channel in the mounting member. Cooperative deformation of the deformable sleeve and the mounting member will cause the two members to deform to engage one another, thereby securing the generally rigid member to the mounting surface.

7 Claims, 6 Drawing Sheets

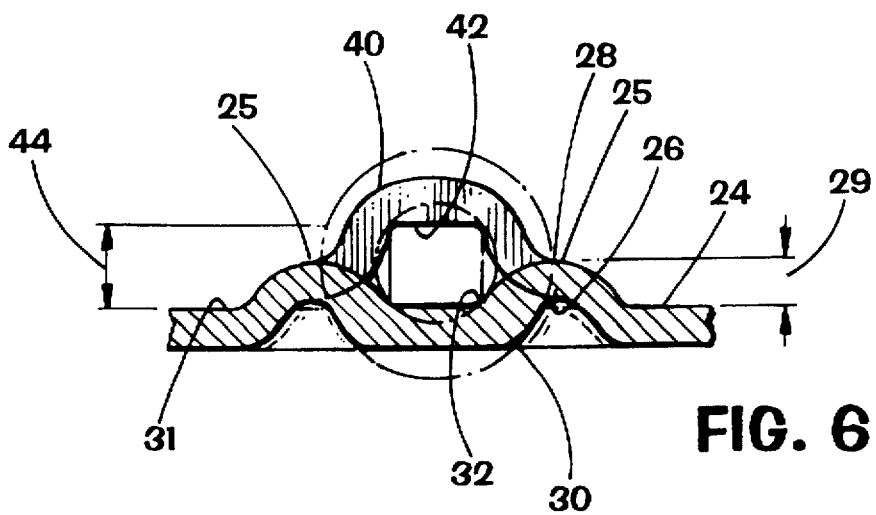
FIG. 6
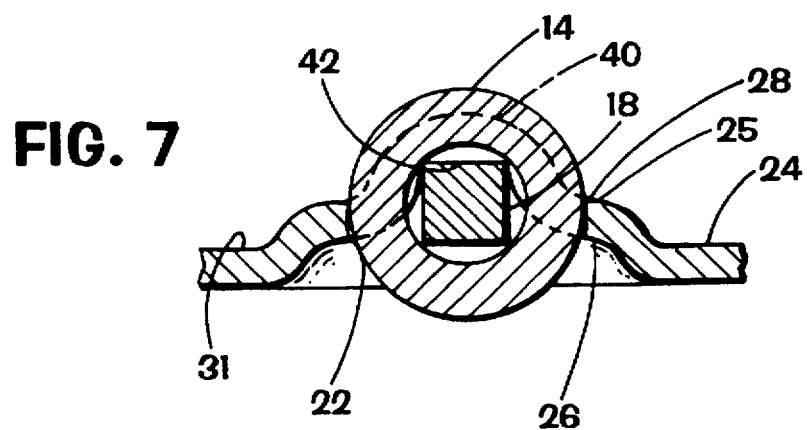
FIG. 7
FIG. 9
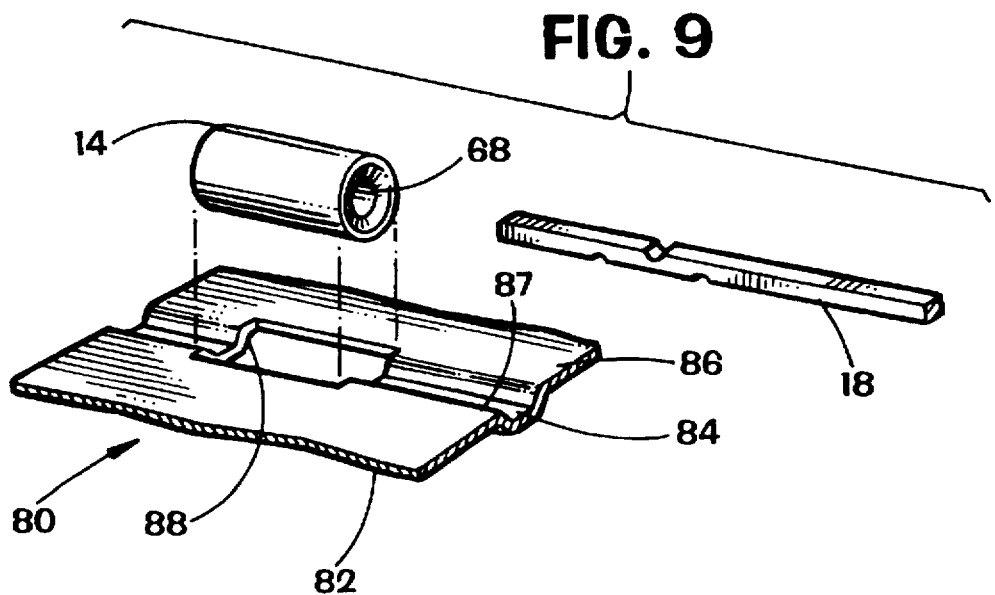

FIG. 8A
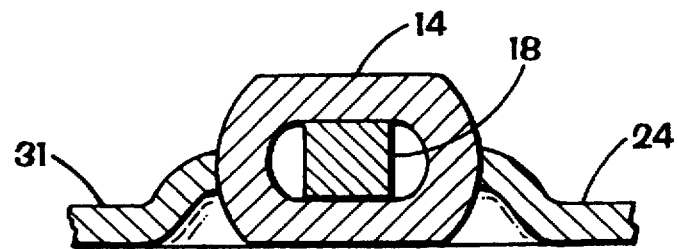
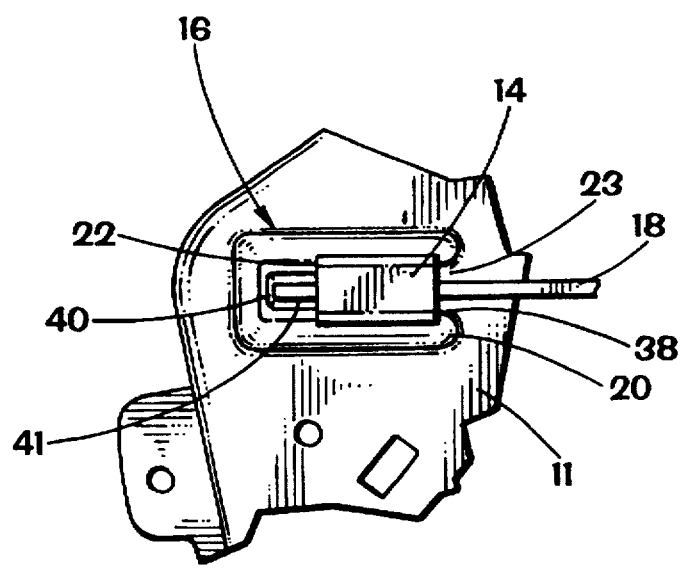
FIG. 8B

METHOD FOR TERMINATING WIRE OR OTHER ELONGATED GENERALLY RIGID ELEMENTS

This application is a division of application Ser. No. 08/541,737, filed Oct. 10, 1995 and now U.S. Pat. No. 5,566,432, which is a continuation of application Ser. No. 08/104,185 filed on Aug. 9, 1993, now abandoned.

BACKGROUND OF THE INVENTION

The present invention relates generally to methods and apparatus for terminating wire or other elongated, generally rigid, elements; and more specifically relates to mounting systems adapted to secure a wire, or other similar generally rigid member, to a surface. The present invention is considered to have particular applicability in securing elements such as spring wire members to a mounting surface. Such applications are often found, for example, in spring clutch systems of the type used in automotive parking brake mechanisms.

Problems associated with securing a wire element to a mounting surface are well known. In many applications where such a mounting is necessary, the wire, and therefore the mounting assembly, will be subjected to high tensile loads. In the above example of a spring clutch for a parking brake, the spring wire and the mounting assembly must sustain a high number of cycles of high tensile loading. If a wire and associated mounting are to withstand such loads, the mounting must not induce bending moments into the wire, and must avoid impairing the tensile capacity of the wire.

An exemplary conventional mounting system utilizes an anchoring plate, having a plurality of teeth or serrations, which is riveted to a mounting surface in an overlying relation to the spring wire so as to secure the spring wire in a fixed position relative to the mounting surface. An exemplary system of this type is depicted in FIG. 1. Such systems, although generally satisfactory when properly implemented, suffer from the deficiency that such systems require significant attention to assure trouble free installations. For example, the process of riveting, or otherwise securing, the anchoring plate to the mounting surface is difficult to control. If the securing operation places excessive force upon the anchoring plate, the wire may be nicked by the serrations, leading to premature failure of the wire under cyclical loading. Similarly, the application of too little force in securing the anchoring plate will obviously reduce the retaining force, leading to "pulling out" of the spring wire under tensile loading. The difficulty of controlling these processes within desirable limits is exacerbated by variations in dimensions of the parts of the assembly.

Accordingly, the present invention provides a new method and apparatus for mounting a wire, or similar elongated, generally rigid member, to a solid mounting surface which provides optimal retention of the wire or similar member, and which provides such optimal retention over a much wider range of component manufacturing tolerances than was available through prior mounting systems.

SUMMARY OF THE INVENTION

The present invention provides a termination assembly for an elongated, generally rigid member, such as wire. The termination assembly is adapted to retain the member to a mounting member or surface. In one preferred embodiment, the termination assembly in accordance with the present invention includes a deformable sleeve member having an aperture which is sized and configured to receive at least a portion of the wire to be terminated or "retained". This aperture may be a recess, but preferably will be a through-hole extending through the sleeve member. In one preferred embodiment, the deformable sleeve member is an elongated member having a generally toroidal cross section.

In this preferred embodiment, the termination assembly also includes a mounting member of which at least a portion is deformable. This deformable portion includes a pair of generally opposed sidewalls which extend to a first side of the mounting member to cooperatively define a raised channel. In a particularly preferred embodiment, the channel includes an aperture or notch formed between the sidewalls defining the channel. Also in this particularly preferred embodiment, the sidewalls will be generally parallel. The channel is sized and configured to receive the deformable sleeve with the sleeve extending at least partially through the aperture in an un-deformed state. Preferably, a "close clearance" fit will be formed between the undeformed sleeve member and the sidewalls defining the channel. Subsequent deformation of the sleeve member and the mounting member, such as through use of a press or orbital riveter, causes deformation of the sleeve member to securely engage the wire, and causes cooperative deformation of the mounting member and the sleeve member to cause the two members to securely engage one another, thereby securing the wire to the mounting member.

In one preferred implementation of the invention, the wire will be provided with a rugose surface to improve engagement between the deformed sleeve member and the wire. In a particularly preferred embodiment, the wire will be provided with a plurality of curvilinear upsets in the exterior surface to provide the desired rugosity.

BRIEF DESCRIPTION OF THE DRAWINGS

FIG. 6 depicts the wire retaining system of FIG. 1 in partial vertical section along line 6—6 in FIG. 3A.

FIG. 7 depicts the wire retaining system of FIG. 1 in partial vertical section along lines 7—7 in FIG. 3A.

FIGS. 8A-B depict the wire retaining system of FIGS. 3A-B after pressing to form a complete assembly.

FIG. 9 depicts an alternative embodiment of a wire retaining system in accordance with the present invention, illustrated in an exploded, oblique, view.

DETAIL DESCRIPTIONS OF PREFERRED EMBODIMENTS

Figure 2:
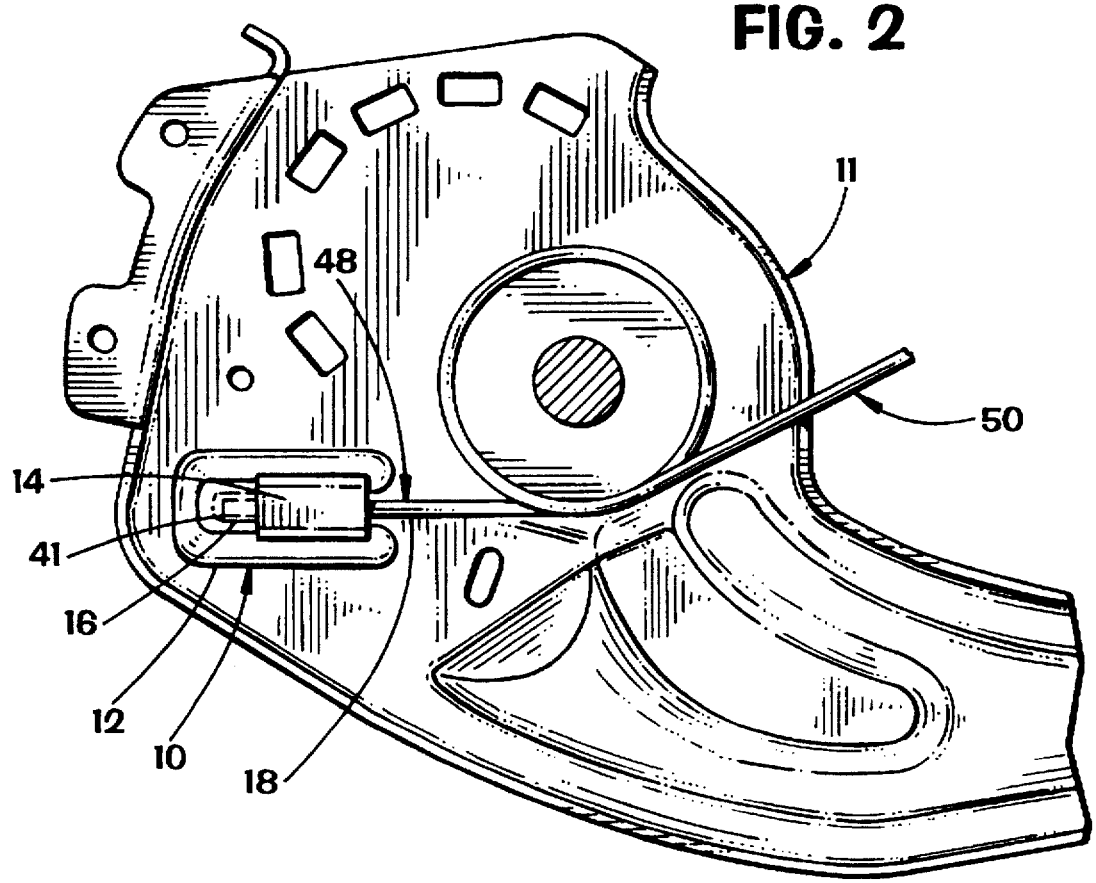
FIG. 2 depicts an exemplary wire retaining system in accordance with the present invention depicted in an exemplary installation.
Figure 3A:
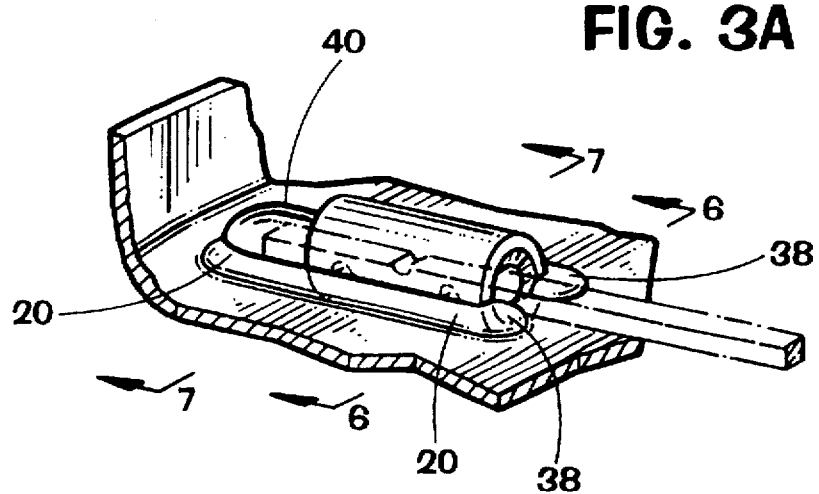
FIGS. 3A-B depict the component parts of the wire retaining system of FIG. 2, depicted in FIG. 3A from a side oblique view of the assembled components, and depicted in FIG. 3B in an oblique exploded view.
Figure 3B:
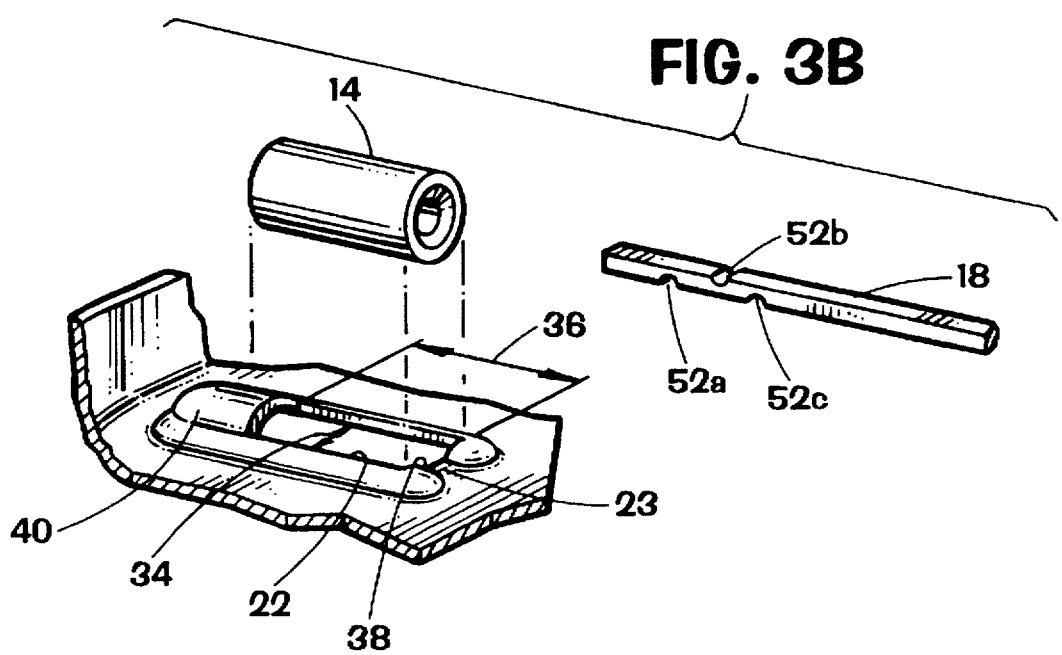

Referring now to the drawings in more detail, and particularly to FIGS. 2 and 3A–B therein is depicted an exemplary wire retaining system 10 in accordance with the present invention. Wire retaining system is depicted in FIG. 2 after deformation to form a completed assembly. The invention will be described herein in terms of an exemplary embodiment sized and configured to secure spring wire, of a type which might be expected to be found in an automotive parking brake clutch, to a mounting plate. Wire retaining system 10 is depicted in connection with a parking brake lever arm 11. As will be appreciated by those skilled-in-the-art, the invention is applicable to retaining any of a number of types of wire, or other similar solid elongated members to a solid surface. Accordingly, as used herein, the term "wire" is not to be considered as limiting upon the scope of the present invention, but is representative of any of a number of types of elongated, generally rigid elements which may be beneficially secured to a surface through use of the present invention.

Wire retaining system 10 includes a deformable mounting member 12 and a retaining button 14. In general, deformable mounting member 12 is formed to form extending sidewalls which define an elongated channel 16. The wire 18 to be retained will be inserted through a central aperture in deformable retaining button 14, and retaining button 14 will be placed within elongated channel 16. A press or similar mechanism will then be utilized to swedge the sidewalls defining elongated channel 16 and retaining button 14 together, and to swedge retaining button 14 to wire 18 to securely attach wire 18 to deformable mounting member 12. With this overview having been provided, specifics of an exemplary preferred embodiment of wire retaining system 10 will be described in greater detail.

In a preferred embodiment of the invention intended for use as a component of a parking brake spring clutch, the spring wire utilized may have, for example, a cross sectional width 17 of approximately. 0.125" and a cross sectional height 19 of approximately 0.093". As is known in the art, such wire will have a tensile strength typically in excess of 200,000 psi, and preferably in excess of 225,000 psi.

Deformable mounting member 12 may be a primary structural member itself (such as, for example, a parking brake lever arm 11), or may be a separate member which will be secured to a primary structural member. In a wire retaining system for retaining a wire (as described above) in a parking brake clutch assembly, deformable mounting member 12 will preferably be formed of a low carbon steel, such as 1008–1010 steel, and will preferably have a nominal thickness of approximately 0.060–0.090". As is best seen in FIGS. 2 and 3A–B, deformable mounting member 12 will be initially deformed to establish upwardly extending sidewalls 20 defining elongated channel 16. Mounting member 12 may be deformed to define elongated channel 16 through a conventional die-stamping process. In this exemplary embodiment, a notch 22 is defined within elongated channel 16. Once again, notch 22 may be formed by a conventional die stamping process.

In this depicted preferred embodiment, upstanding sidewalls 20 define an open end flat separation gap 23 having a flat dimension of approximately 0.125–135". Flat separation gap 23 facilitates complimentary engagement with the width of spring wire 18 which will extend through gap 23. Deformable member 12 has a nominal base plane portion, indicated generally at 24. The following contours will preferably be formed to cause sidewalls 20 to extend only to one side of this base plane portion. In the depicted exemplary embodiment, the top of each sidewall is at an upper deflection point, indicated generally at 25. Mounting member 12 will preferably be formed to define an upper deflection point internal radius 26 of approximately 0.03". The upper deflection point external radius, as indicated generally at 28, may be approximately 0.120". Similarly, the lower deflection point external radius, indicated generally at 30, may also be approximately 0.120". The lower deflection point internal radius, indicated generally at 32 will preferably be at least 0.017". Such radii facilitate the forming of sidewalls 20 into the desired conformity, while avoiding cracking of the material forming mounting member 12. In one preferred embodiment, upper deflection points 25 will each have a maximum extension of a distance 29 above base plane surface 31 which is approximately equal to the average between the thickness of spring wire 18 and the thickness of mounting member 12 proximate base plane portion 24. Accordingly, in the described embodiment, such extension distance 29 will be approximately 0.060–0.090. In one preferred embodiment, this results in the material thickness at the upper extent of sidewalls 20 (adjacent notch 22), being generally centrally aligned with the midpoint of the height 17 of spring wire 18, and also preferably with the midpoint of retaining button 14.

In this embodiment, notch 22 will have a width 34 which is generally uniform along the length of notch 22, and which is preferably approximately 0.377". The length 36 of notch 22 will preferably be approximately 0.752". Notch 22 will preferably be formed proximate the uppermost point of parallel upper deflection point 25. As will be appreciated from the Figures, the forming of notch 22 behind the uppermost point of each upper deflection point internal radius 26 provides opposing shoulders 38 at the forward end of notch 22 adjacent separation gap 23.

At the rearward end of elongated channel 16, is a rear dome portion 40. Rear dome portion 40 is deformed upwardly to define an upper flat surface 42 which is elevated by a distance 44 from the upper surface of base plane portion surface 31 (maintained as the surface of separation gap 23) of approximately 0.095–0.110". This distance 44 is slightly greater than the height 19 of spring wire 18 (0.093"). Rear dome portion 40 extends between sidewalls 20 to define a general U-shape to channel 16. The edge of rear dome portion 40 defines an upset to engage a rearward end of retaining button 14.

Figure 4A:
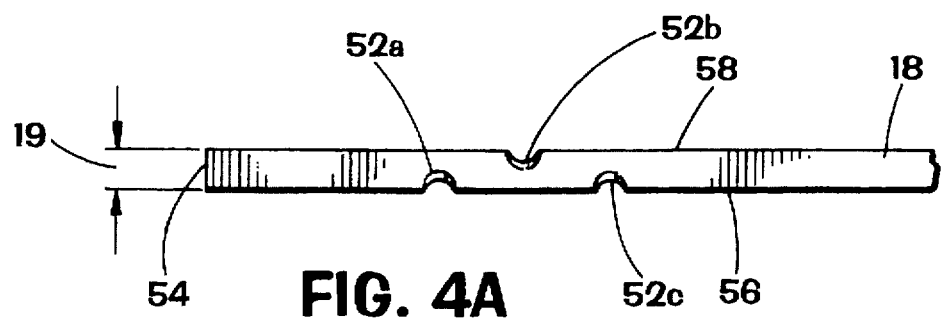
FIGS. 4A-C depict an exemplary spring wire as may be retained through use of the present invention, with upsets formed therein in accordance with the present invention; depicted in FIG. 4A in a side view of a portion of the elongated spring wire element; depicted in FIG. 4B from a side view depicting a single upset; and depicted in FIG. 4C from a top view of the portion containing the upsets depicted in FIG. 4A.
Figure 4B:
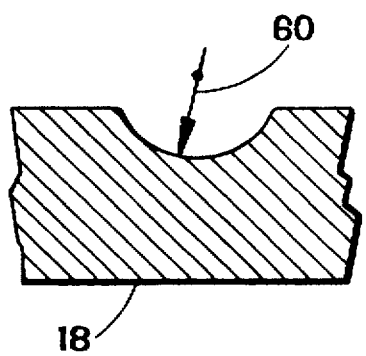
Figure 4C:
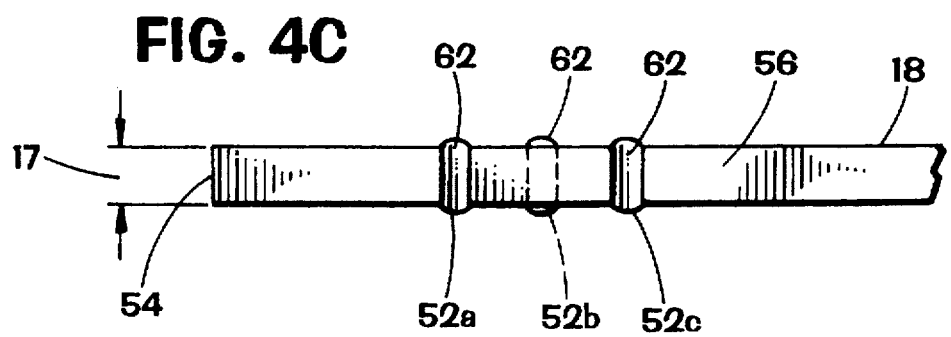

Referring now to FIG. 2 and to FIGS. 4A–C, therein is depicted the spring wire 18 being secured in the depicted exemplary embodiment. In one exemplary embodiment, spring wire 18 may have an overall extended length several feet, but is curled through a plurality of turns, to yield extending, generally opposed, ends 48, 50. As can best be seen in FIGS. 4A and 4C, at least one end 48 will include a plurality of upsets 52 to facilitate retention in wire retaining system 10. In this preferred embodiment, three upsets 52a–c are provided proximate wire end 48. Also, in this preferred embodiment, each upset 52a–c extends generally across the entire width 17 of spring wire 18. Upsets will be placed to lie within retaining button 14 when spring wire 18 and mounting button 14 are engaged with mounting member 12 and to minimize bending moments in spring wire 18. For example, in one configuration, outermost upset 52a is inset approximately 0.35", on center, from end surface 54 of wire 18. Upset 52c is then preferably inset an additional 0.35", on center, from upset 52a, and is preferably located on the same lower surface 56 as upset 52a. Upset 52b is preferably centered between upsets 52a and 52c and extends upwardly from the top surface 58 of spring wire 18.

As can best be seen in FIG. 4C, each upset preferably extends for a depth of between 9% to 25% of the cross sectional height 60 of spring wire 18. Most preferably, each upset will extend inwardly for approximately 14%–19% of the height 19 of spring wire 18. In the described embodiment, each upset will preferably extend for a depth of approximately 0.013–0.018". Further, each upset is preferably formed with a relatively wide radius 60, for example, a radius of approximately 0.045". It is important to avoid the establishing of a tight radius or of another surface which might induce an angular deflection point in wire 18. Upsets 52a–c may be formed through a conventional stamping process. As is known to the art, during such a process some flattening, resulting in sidewardly protruding extensions 62, may be encountered. No detrimental effects result from such extensions 62, and there is no need for them to be removed from spring wire 18 prior to assembly in wire retaining system 10.

Upsets 52a–c have been depicted on the top and bottom surfaces of spring wire 18. Such placement may be varied. For example, where wire having a significant ratio of width to height (i.e., appreciably greater than 1), is utilized, it may be preferable to place upsets on side surfaces of the wire to facilitate use of the smallest possible aperture in retaining button 14 to receive the wire.

Although the preferred embodiment described herein includes a plurality of upsets, other alternative measures for providing a rugose surface to the spring wire may also be employed with the present invention. For example, in some applications sand blasting or shot peening the end portion of wire 18 may yield satisfactory results. Alternatively, deformation of the wire, such as through the providing of a twist in the wire may also prove satisfactory for some applications.

Figure 5:
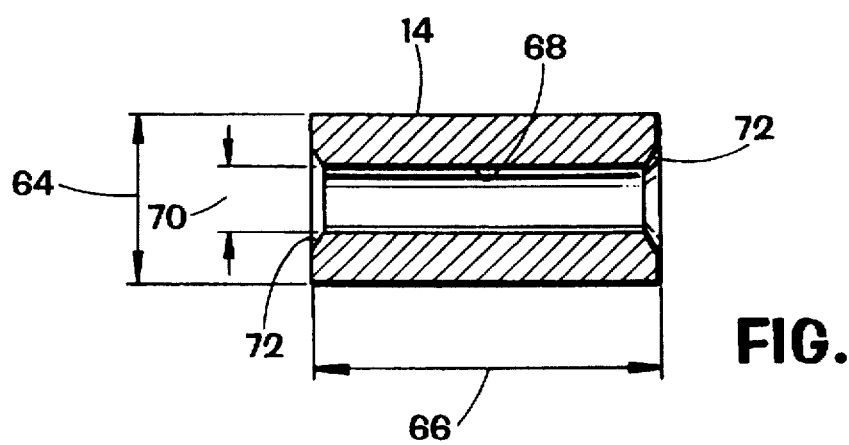
FIG. 5 depicts a retaining button used in the exemplary wire retaining system of FIG. 2, illustrated in vertical section.

Referring now to FIG. 5, therein is depicted an exemplary retaining button 14 suitable for use with the present invention. Retaining button 14 is preferably again formed of medium carbon steel such as C1030–1035 steel. In the embodiment configured for use with the wire and mounting plate described herein, retaining button 14 will have an external diameter 64 of approximately 0.373–0.375" and a length 66 of approximately 0.75". Retaining button will also have a longitudinally extending aperture 68 centered approximately along the centerline of button 14, such aperture having a diameter 70 of approximately 0.155–0.159". Additionally, a small counter sink 72, such as an approximately 118° counter sink across a diameter of approximately 0.255–0.265" proximate aperture 68 may be provided proximate each end of button 14.

To assemble wire retaining system 10, retaining button 14 will preferably first be slipped over end 50 of wire 18 having upsets 52a–c formed therein. The engaged assembly of wire 18 and retaining button 14 will then be engaged with elongated channel 16 formed in deformable mounting member 12. Retaining button 14 will preferably have a close clearance fit within notch 22. Wire 18 should extend longitudinally beyond retaining button 14 such that wire 18 extends beneath rear dome portion 40 of channel 16. Preferably, wire 18 will extend approximately 0.25" beyond retaining button 14, providing a "tail end" 41 extending beneath dome portion 40. When such placement is achieved, a pressing force will be applied to swedge retaining button 14, mounting member 12 and wire 18 together.

In one implementation, a conventional press providing two flat, generally parallel, opposed surfaces may be utilized to perform the described swedging step. In such implementations, with materials as described herein, a press force of approximately 20 tons is require. Alternatively, other apparatus, such as an orbital riveter, as is known to the art, may be utilized to successfully roll down the contours of the described components, and thereby swedge the assembly together.

Figure 1:
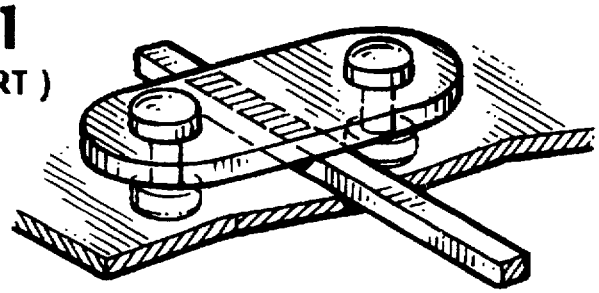
FIG. 1 depicts an exemplary prior art wire termination system.

An exemplary wire retaining system as described herein has been found to provide substantial improvements in the anchoring of a wire against tensile load. For example, relative to prior art designs utilized for retaining wire by the assignee of the current invention, as depicted in FIG. 1, a spring wire retaining system substantially as described herein has been found to be able to hold approximately four times the tensile load for a given spring wire size.

The shoulders 38 flanking flat separation gap 23 provide an upset to retain button 14 during tensile loading. Additionally, the engagement of the rearwardly extending "tail" of wire 18 with upper surface 42 of rear dome portion 40 again serves to further stabilize the positioning of button 14 and to thereby prevent pull-out during high tensile loading.

Figure 10:
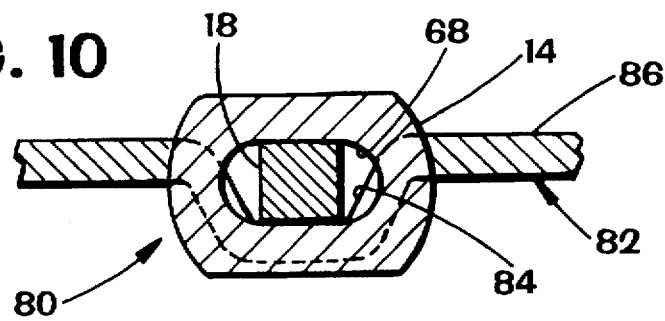
FIG. 10 depicts the wire retaining system of FIG. 9 after assembly, illustrated partially in vertical section.

Referring now to FIGS. 9 and 10, therein is depicted an alternative embodiment of a wire retention assembly, indicated generally at 80, in accordance with the present invention. In this illustrative alternative embodiment, spring wire 18 and retaining button 14 may be of essential identical configurations to those described relative to the embodiment of FIGS. 1–8. A different configuration, however, is provided to a mounting plate 82. Mounting plate 82 also includes a longitudinal channel 84 configured to receive wire 18. Channel 84 may, once again, be formed through conventional die stamping techniques, and will preferably extend to one side of a base plain surface 86 of mounting member 82. Preferably, channel 84 will be deformed from base plain portion 86 for a sufficient distance as to have a depth approximately equal to the height of wire 18.

Mounting member 82 also includes a notch or aperture 88 which is preferably symmetrically located relative to channel 84. Notch 88 may have dimensions essentially identical to those described to notch 22 of wire retaining system 10. The described structure allows a lower surface 87 of channel 84 to form a wire contacting surface, interrupted by the presence of aperture 88.

Wire termination assembly 80 will be assembled in an analogous manner to that described relative to wire retention assembly 10. Once wire 18 is inserted into central aperture 68 of retaining button 14, and retaining button 14 is engaged with notch 88, with wire 18 lying adjacent lower surface 87 of channel 84, the parts will be swedged together as previously described.

Figure 11:
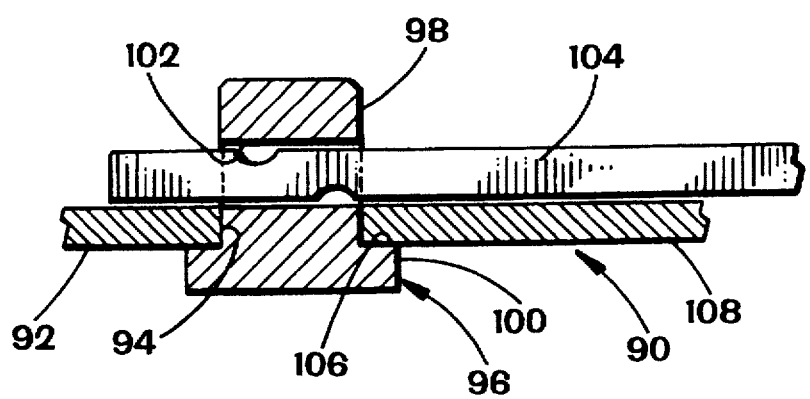
FIG. 11 depicts another alternative embodiment of a wire retaining system in accordance with the present invention, illustrated partially in vertical section.
Figure 12:
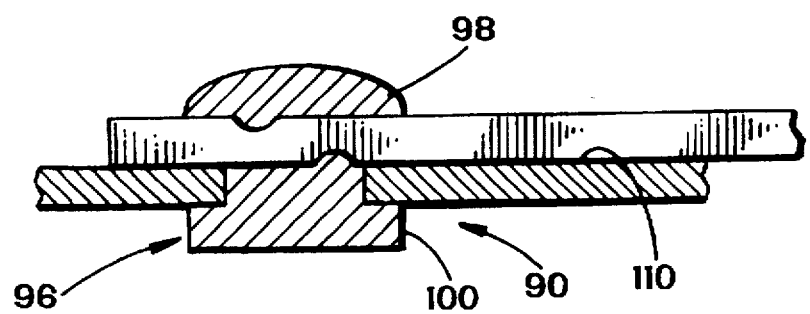
FIG. 12 depicts the wire retaining system of FIG. 11, after assembly, illustrated partially in vertical section.

Referring now to FIGS. 11 and 12, therein is depicted yet another alternative embodiment of a wire retaining system, indicated generally at 90, in accordance with the present invention. Wire retaining system 90 differs from the previously described embodiments in that it includes a mounting member 92 which does not include a laterally offset portion, but which merely includes an aperture 94. A deformable retaining member 96 includes an elongated body portion 98 and a ranged portion 100. Body portion 98 is configured to extend through aperture 94 in relatively close clearance engagement with the sidewalls defining aperture 94. Body portion 98 also includes a generally diametrically aligned aperture 102 sized to receive the wire member 104. Flanged portion 100 includes generally annular engaging surfaces 106 to engage a first side 108 of retaining member 92 to limit travel of deformable retaining member 96 through aperture 96.

In one exemplary embodiment, where retaining member 96 would be configured to retain an approximately ⅛ inch square wire, body portion 98 may have a diameter, for example, of approximately 0.5 inch, while flanged portion 100 would have a diameter of approximately 0.625 inch. Retaining member 96 will be formed of low carbon steel. Aperture 102 in retaining member 96 will preferably be offset from contact surface 106 of flanged portion 100 for an appropriate distance to facilitate wire 104 being retained in engaging contact with an upper surface 110 of mounting member 92.

As is apparent from the figures, to assemble wire retaining system 90, deformable retaining member 96 is inserted through aperture 94 in mounting member 92, and wire 104 is inserted through aperture 102 in retaining member 96. Retaining member 96 is then deformed, such as by swedging, to secure wire 104 to mounting member 92.

Many modifications and variations may be made in the techniques and structures described and illustrated herein without departing from the spirit and scope of the present invention. For example, in addition to the alternatives expressly discussed herein, the method of the present invention is equally applicable to the retaining of wire or other solid members having different cross sectional conformities, such as round, hexagonal, octagonal, etc. Additionally, other materials may be utilized for components herein. For example, for some applications it may be satisfactory to utilize one of various aluminum alloys as a material for retaining button 14 and/or mounting member 12. Accordingly, the embodiments described and illustrated herein are illustrative only and should not be considered as limitations on the scope of the present invention.

What is claimed:

1. A method of terminating an elongated, generally rigid member, comprising the steps of:
   providing a deformable sleeve member having an aperture therethrough, said aperture sized and configured to receive at least a portion of said elongated generally rigid member;
   providing a mounting member including a deformable portion, said deformable portion including a pair of generally opposed sidewalls defining a channel therebetween, said channel configured to receive said deformable sleeve and said elongated, generally rigid member;
   assembling said elongated, generally rigid member said deformable sleeve member, and said mounting member with said elongated, generally rigid member extending through said deformable sleeve member and with said deformable sleeve member engaging said channel of said mounting member; and
   applying a force to said deformable sleeve member and to said mounting member, thereby cooperatively deforming each of said members sufficiently to cause said deformable sleeve member to engage said elongated, generally rigid member and to cause said sleeve member and said mounting member to cooperatively engage one another to secure said elongated, generally rigid member to said mounting member.

2. The method of claim 1, wherein said channel provided in said deformable portion of said mounting member is a generally U-shaped channel, and wherein an aperture is formed within said channel.

3. The method of claim 1, wherein said provided deformable sleeve member has a generally toroidal cross section.

4. The method of claim 1, further comprising the step of forming one or more upsets on at least a portion of said elongated, generally rigid member.

5. The method of claim 1, wherein said force supplied to said deformable sleeve member and to said mounting member is applied through a press.

6. The method of claim 4, wherein said force supplied to said deformable sleeve member and to said mounting member is applied through an orbital riveter.

7. A method of terminating an elongated, generally rigid member, comprising the steps of:
   providing a deformable sleeve member having an aperture therein, said aperture sized and configured to receive at least a portion of said elongated, generally rigid member;
   providing a deformable mounting member including an aperture therethrough, said aperture sized and configured to receive at least a portion of said deformable sleeve member;
   assembling said elongated, generally rigid member, said deformable sleeve member and said deformable mounting member, with said deformable sleeve member extending at least partially through said aperture in said deformable mounting member; and
   applying a force to said deformable sleeve member and to said deformable mounting member, thereby cooperatively deforming each of said members sufficiently to cause said deformable sleeve member to engage said deformable mounting member and said elongated, generally rigid member and to thereby secure said elongated, generally rigid member to said deformable mounting member.

* * * * *